United States Patent [19]

Red et al.

[11] 4,118,407

[45] Oct. 3, 1978

[54] FATTY ACID RECOVERY FROM SOAPSTOCK

[75] Inventors: Jerry F. P. Red, Cleveland, Ohio; Juan B. Ilagan, Jr., Fullerton, Calif.

[73] Assignee: SCM Corporation, New York, N.Y.

[21] Appl. No.: 810,518

[22] Filed: Jun. 27, 1977

Related U.S. Application Data

[63] Continuation-in-part of Ser. No. 757,380, Jan. 6, 1977, abandoned.

[51] Int. Cl.² ............... C11B 13/00; C11C 1/04
[52] U.S. Cl. ............... 260/412.5; 260/417; 260/418; 260/424; 260/425

[58] Field of Search ............ 260/412.5, 419, 424, 260/425, 417, 418, 97.6

[56] References Cited

U.S. PATENT DOCUMENTS

| 2,802,845 | 8/1957 | Sadler .................. 260/97.6 X |
| 3,575,952 | 4/1971 | Morris et al. ........... 260/97.6 |
| 3,804,819 | 4/1974 | Wengrow et al. ........ 260/418 |
| 3,830,789 | 8/1974 | Garrett et al. ......... 260/413 X |

Primary Examiner—John Niebling
Attorney, Agent, or Firm—Jerry K. Mueller, Jr.

[57] ABSTRACT

Free fatty acid from crude soapstock is recovered in good purity by the instant process.

10 Claims, 1 Drawing Figure

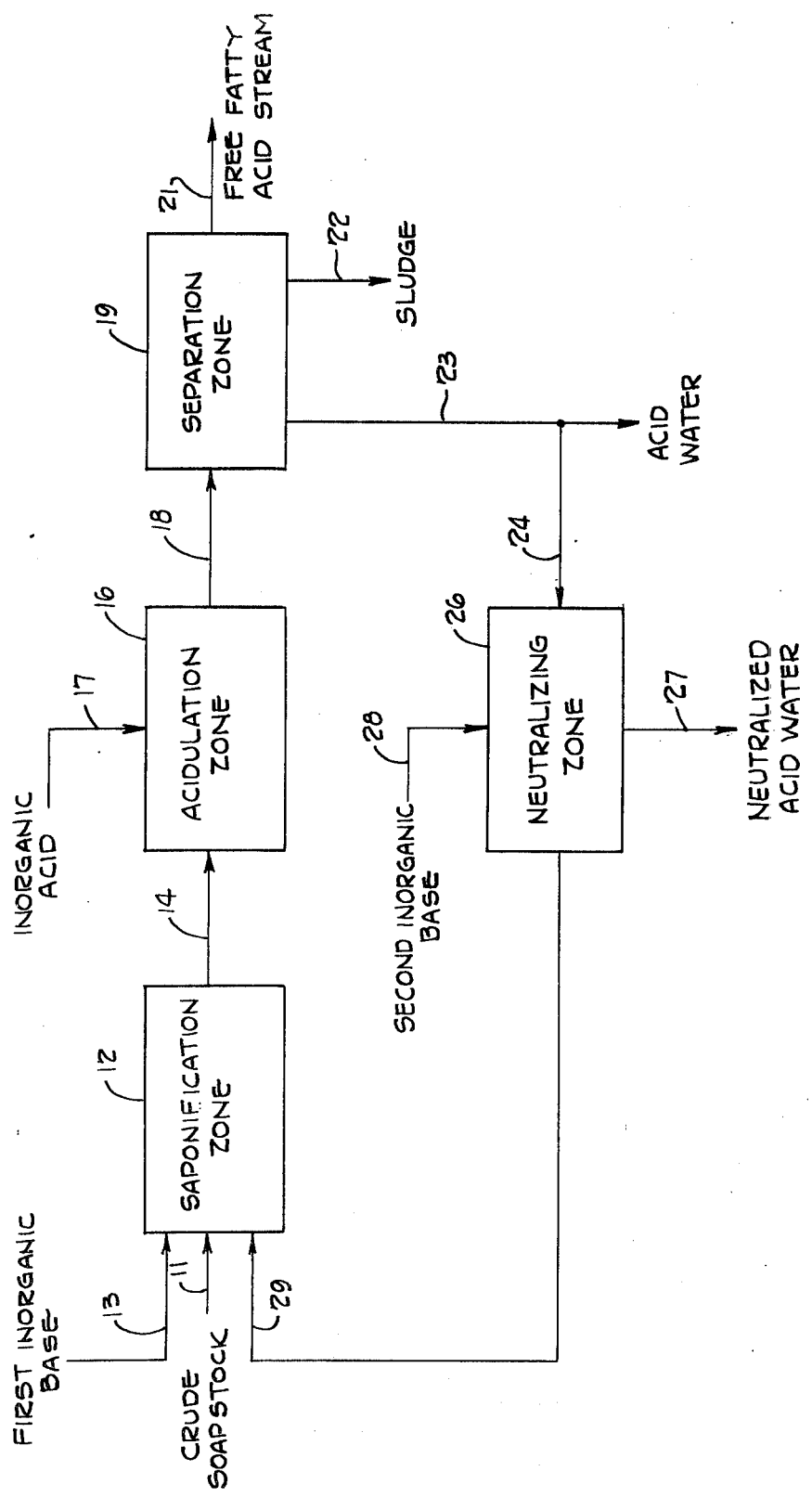

FATTY ACID RECOVERY FROM SOAPSTOCK

CROSS-REFERENCE TO RELATED APPLICATIONS

This application is a continuation-in-part of applicants' co-pending application Ser. No. 757,380, filed on Jan. 6, 1977 now abandoned.

BACKGROUND OF THE INVENTION

This invention relates to treatment of crude soapstock byproduct from alkali refining of triglyceride oils and more particularly to an improvement in process for recovering free fatty acid from the crude soapstock.

Alkali refining of triglyceride oils comprehends treatment of the oils with strong (typically 10°–20° Baume') caustic soda to remove a variety of impurities therefrom such as free fatty acid, phosphitides, unsaponifiable material, and the like. Usually excess caustic solution (to neutralize all the free fatty acid present) is mixed with the oil at about 20°–35° C. This causes an emulsion to form. Such emulsion then is heated at about 55°–65° C. for breaking it, and the resulting alkali refined oil is recovered by conventional techniques such as by filtering, decanting, centrifuging, or the like. The major byproduct formed by breaking the emulsion is alkali metal soap of the free fatty acid (crude soapstock) having oil entrained therein and typically contaminated with minor amounts of gums, slimes, and phosphatides. Various washwater streams for cleaning equipment and the like also can contain crude soapstock as well as water used in processing fatty emulsifiers (eg., monoglycerides), stearines, and the like. These other soapstock-containing water streams also can be processed by the present invention for recovery of their free fatty acid content.

Usually crude soapstock from edible oil refineries is sold to the animal industry for feed or it can be acidulated with mineral acid (typically sulfuric acid of 98% strength) to form a fatty acid stream from which 40–45% of the free fatty acid initially in the soapstock can be recovered. The crude soapstock appears as a viscous mass which typically can be made flowable only by dilution with water and heating.

Heretofore it has been proposed (Canadian Pat. No. 979,889) to saponify the crude soapstock followed by subjecting the saponified soapstock to solvent extraction to remove a variety of contaminant materials. The extracted mixture then is acidulated to spring the free acid which is separated by conventional separation techniques.

Advantages of the present invention include recovery of greater than 90% of the free fatty acid content from the crude soapstock fed to the process, reducing viscosity of the soapstock, and obtaining a clean separation of free fatty acid from acid water in a separation step of the process. Additionally, byproduct inorganic salt (preferably sodium sulfate) dissolved in water is withdrawn from the process, which inorganic salt solution has commercial value.

BROAD STATEMENT OF THE INVENTION

The instant invention is an improvement in process for recovering free fatty acid from crude soapstock byproduct also containing saponifiable fatty material comprising glyceride oil. Such improvement in process comprises: passing the discharged crude soapstock, a first inorganic base, and recycle of neutralized acid water from a later step of the process into a saponification zone held at a temperature of about 80° to about 95° C.; acidulating the resulting saponified soapstock with inorganic acid in an acidulation zone; passing the resulting acidulated crude soapstock to a separation zone; and withdrawing therefrom product free fatty acid and byproduct acid water. At least a portion of the acid water is passed to a neutralization zone and therein the acid water is treated with a second inorganic base to at least neutralize the acid water. At least a portion of the resulting neutralized acid water then is recycled to the saponification step of the process. The neutralizing agent content (base strength) of the first inorganic base and/or the neutralized acid water fed to the saponification zone is sufficient to saponify the free oil content in the crude soapstock and hydrolyze the phosphatides to fatty acids, i.e. virtually completely saponify the soapstock in the saponification zone.

BRIEF DESCRIPTION OF THE DRAWING

The drawing is a flow diagram showing how the present invention has been practiced. Instrumentation, controls, feeders, agitators, fittings, pumps, and valves are not shown, but are to be provided where necessary or desirable in conventional fashion. Materials of construction for this process are conventional. Thus, corrosion-resistant materials such as austenic stainless steel, plastic, glass-lined steel, wood, or even clay can be used where necessary. Concrete or steel can be used where corrosion or erosion is inconsequential. Various of the tanks and lines illustrated can be multiple, series, cascade, or parallel connected for additional treating time or capacity.

DETAILED DESCRIPTION OF THE DRAWING

Crude soapstock 11, first inorganic base 13, and a recycle of neutralized acid water 29 (from a later step of the process) is passed into saponification zone 12 and therein preferably all entrained free oil is saponified to soap and byproduct glycerine. The feed to saponification zone 12 can be initially admitted to a mixing zone prior to entering saponification zone 12 and/or various combinations of the three feed streams can be advantageously premixed prior to the saponification reaction. The temperature of the saponification zone is maintained between about 80° and about 95° C. for prevention of foaming and to insure proper viscosity of the contents in saponification zone 12. The resulting saponified soapstock then is withdrawn from saponification zone 12 through line 14 and passed into acidulation zone 16 along with the flow of inorganic acid 17. In acidulation zone 16, the fatty acid is sprung from the crude soapstock.

The resulting acidulated crude soapstock then is withdrawn from acidulation zone 16 through line 18 and passed into separation zone 19. In separation zone 19 the acidulated crude soapstock is separated into product free fatty acid 21 and byproduct acid water 23. Minor amounts of sludge 22 also are withdrawn from separation zone 19. The separation zone 19 can be a single separating unit or it can consist of a series of separators advantageously in parallel and/or series for maximizing the separation step.

At least a portion of acid water 23 is tapped through line 24 and passed into neutralizing zone 26 along with a flow of second inorganic base 28. Alternatively, the entire flow of acid water 23 can be diverted through line 24 into neutralizing zone 26 in which case neutralized acid water 27 will be withdrawn from neutralizing zone 26. In neutralizing zone 26 the acid water is rendered at least neutral (pH advantageously about 6 to 8) and can be made mildly to strongly alkaline if desired. At least a portion of the neutralized acid water in neutralizing zone 26 is withdrawn through line 29 and recycled to the saponification step of the process. Recycled stream 29 (neutralized acid water) will advantageously contain around 11 to 17% by weight inorganic salt which advantageously promotes the saponification step of the process.

DETAILED DESCRIPTION OF THE INVENTION

Of importance in the present process is that the crude soapstock is completely saponified (further saponified or resaponified), preferably with excess inorganic base (based on the soapstock entering the saponification zone assuming full saponification of the soapstock, i.e. dry basis of soapstock). Typical commercial crude soapstocks from edible oil refineries will contain around 10% to about 20% by weight free oil which advantageously is virtually completely saponified in the saponification step of the process. Also, a significant portion of the phosphatide content in the crude soapstock will be hydrolyzed to free fatty acid in the saponification zone. Various other saponifiable fatty material (oil or lipoidal material) in the crude soapstock preferably is saponified also. Such fatty material includes free oil, partial esters of fatty acid and polyol (eg., monoglycerides, diglycerides, monoglycolates, diglycolates, etc.), and like fatty acid-containing material. The amount of excess base added to the soapstock in the saponification zone determines the rate of saponification and generally an excess of about 25% will suffice for purposes of the present process. Palm and cottonseed oil, for example, are the hardest and most difficult of edible oils to saponify as they are physically very viscous. Generally, a 25% excess of base will saponify these oils in less than about 2 hours in commercial scale operations, and typically only about ½ hour is required to complete this step. Palm kernel and coconut oil, for example, are more flowable and easier to saponify and, thus, less than about 25% excess base generally will be sufficient to saponify there oils in the process. Typical inorganic bases for use in the present process include the hydroxides, oxides, carbonates, acetates, formates and the like of alkali metals and alkaline earth metals such as, for example, sodium hydroxide, potassium hydroxide, calcium hydroxide, barium hydroxide, calcium carbonate, sodium carbonate, sodium acetate, and the like. Advantageously, the inorganic base is an alkali metal or alkaline earth metal hydroxide such as sodium hydroxide for efficiency and economy. Generally, the crude soapstock is determined to be virtually completely saponified when the proportion of free oil in the soapstock approaches the level or proportion of unsaponifiables therein.

The saponification zone is held at a temperature of about 80° to about 95° C. Temperatures above about 95° C. tend to cause the soapstock to foam excessively which detracts from the effectiveness of the saponification of the process. The crude soapstock, typically a pH of about 8, in rendered alkaline in the saponification zone (to a pH of about 8+ to 10 and higher) by the addition of base to the saponification zone either as a separate flow or contained in the recycle stream of neutralized acid water fed to the saponification zone.

The contents of the saponification zone are mildly agitated for prevention of excess foaming which also detracts from the saponification rate otherwise experienced. Advantageously, the saponification zone can comprise parallel sets of saponification vessels for staged saponification of crude soapstock entering the process.

Work on the present invention also led to the discovery that salts (alkali metal or alkaline earth metal salts, such as sodium sulfate) speeded up the saponification rate in the saponification zone. Saponification times in the present process infrequently exceed about two hours or a little more. The present process permits sodium sulfate, for example, concentration in the neutralized acid water stream to increase to about 11 to 17% by weight equilibrium level from an initial 8 to 11% concentration by neutralizing the byproduct acid water with an inorganic base (preferably sodium hydroxide for efficiency and economy) and recycling the resulting neutralized salt-containing water to the saponification zone. Maximum inorganic material concentration with attendant low organic material content results at the desired 17% equilibrium level of sodium sulfate, thus permitting a good, clean separation of product free fatty acid from byproduct acid water to be practiced also. Generally, about 10% to 50% by weight of the neutralized acid water (based on the contents of the saponification zone) is recycled to the saponification zone. The recycle of neutralized acid water also provides water for diluting the crude soapstock which makes the soapstock more flowable and easier to handle and transport.

The resulting saponified crude soapstock is then acidulated with an inorganic acid, preferably a mineral acid such as sulfuric acid of about 98% strength. Other suitable mineral acids include hydrochloric acid, bromic acid, hydrogen fluoride, and the like. While the acidulation zone can be a vat or vessel, it can also comprise a series of acidulation vessels parallel connected for staged acidulation of the saponified soapstock in the acidulation step of the process. Acidulation of the saponified crude soapstock springs free fatty acid from their corresponding soap with sodium sulfate byproduct resulting (when the inorganic acid is sulfuric acid and the inorganic base in the process is sodium hydroxide). Generally, the pH of the withdrawn acidulated crude soapstock stream is about 1.5 to about 3.5, and preferably about 2.5 to 3.0. As above stated, without a recycle of the neutralized acid water to the saponification zone, the withdrawn stream of acidulated crude soapstock contains typically about 8 to about 11% sodium sulfate by weight. Though not necessary, it can be advantageous to pass the withdrawn stream of acidulated crude soapstock from the acidulation zone to a holding tank or surge tank to permit additional settling time for separation of resulting free fatty acid from acid water and to level out flow rates in the process.

The separation step can be performed by decanting, centrifuging, or like conventional separation techniques. The separation step also can comprise in parallel sets of separating vessels for staged separation of the fatty acid or a set of separation vessels connected in series. The product free fatty acid stream withdrawn from the separation zone typically contains by weight: 90+% free fatty acid, 1-2% unsaponifiable material (hydrocarbons), and 3% or less water with the balance being mostly oxidized fatty acid. The free fatty acid stream can be further purified, if desired, by distillation or other conventional separation techniques. Advantageously, the free fatty acid withdrawn from the separation zone can be fed through a secondary separation zone along with a flow of neutralized acid water from the process for obtaining a purer stream of product free fatty acid.

The acid water withdrawn from the separation zone typically contains by weight: 72% water, 10% organic material (preponderantly glycerine and other short chain compounds), and 18% inorganic materials typically consisting of 98% sodium sulfate and 2% calcium salts (depending, of course, upon the choice of inorganic base and inorganic acid chosen for the present process and upon the particular soapstock being treated). However, some oils such as soybean oil contain a higher proportion of phosphate impurity which results in sodium phosphate (typically about 3-4%) being present in the acid water. At least a portion of the acid water is neutralized with a second inorganic base (preferably a base such as sodium hydroxide for efficiency and economy) and at least a portion of the neutralized acid water recycled to the saponification zone. The amount of base added to the acid water can be sufficient only to neutralize the acid water (pH advantageously of about 7) or it can be in greater proportion to provide sufficient base requirements for the saponification step of the process.

The balance of the acid water or neutralized acid water, depending on a particular operating mode of the process, can advantageously be concentrated and sold for use in the paper pulp industry for its sodium sulfate content (especially in kraft paper pulp processing). Glycerine can be recovered from the neutralized acid water by ultrafiltration or other conventional separation techniques.

The present invention can be further understood in the examples which follow. These examples show how the present invention can be practiced but should not be construed as limiting. In this application, all percentages are weight percentages and all temperatures are in degrees Centigrade, unless otherwise expressly indicated.

EXAMPLE I

A laboratory scale version of the present process was undertaken on five different commercial crude soapstocks. Each soapstock was saponified with a 25% excess of 50% sodium hydroxide (on dry soap basis) with a 10% dilution with 17% sodium sulfate water. Virtually complete saponification of the soybean soapstock was realized in about 60 minutes while the remaining soapstocks were saponified in about five minutes each. Complete saponification was determined to be reached when the level of oil in the soapstock about equalled the level of unsaponifiables therein. The acidulation step was performed with 66° Be' sulfuric acid until a pH of 2.5 was reached (about 5 to 20 minutes residence time in the acidulation zone). Separation then was performed by centrifuging. Analysis of all feedstocks and products are given below.

TABLE I
SOAPSTOCK ANALYSIS (wt. %)

| COMPOSITION | SOYBEAN | COTTONSEED | COCONUT | PALM KERNEL | PALM |
| --- | --- | --- | --- | --- | --- |
| Water | 57.3 | 58.6 | 66.8 | 57.8 | 66.4 |
| Neutral Oil | 14.6 | 13.0 | 17.4 | 26.2 | 8.4 |
| Free Fatty Acid | 1.46 | 0.94 | 0.55 | 0.24 | 1.25 |
| Unsaponifiables | 1.1 | 1.4 | 0.85 | 0.38 | 0.2 |
| Soap | 14.2 | 17.5 | 14.4 | 14.2 | 23.8 |
| Phosphatides | 11.34 | 8.56 | 0 | 0 | 0 |
| Phosphorus | 0.797 | 0.383 | 0.160 | 0.001 | 0 |
| CHEMICAL/PHYSICAL CONSTANTS | | | | | |
| Total Fatty Acid | 23.7 | 27.6 | 27.3 | 38.1 | 21.9 |
| pH | 9.5 | 9.5 | 9.2 | 9.2 | 10.8 |

TABLE II
PHYSICAL-CHEMICAL PROPERTIES OF 90 PLUS FATTY ACIDS (wt. %)

| | Soybean | Cottenseed | Coconut | | Palm Kernel |
| --- | --- | --- | --- | --- | --- |
| Free Fatty Acid | 92.7 | 91.7 | 92.9 | 96.7 | 96.9 |
| Unsaponifiables | 2.3 | 2.8 | 0.7 | 1.3 | 1.1 |
| Water | 0.9 | 1.7 | 2.3 | 0.9 | 0.9 |
| Oxidized Fatty Acids | 1.0 | 6.0 | 0.8 | 1.3 | 0.6 |
| Capillary Melting Point, ° C. | 28.5 | 33.5 | 26.0 | 25.3 | 47.8 |
| Fatty Acid Composition | | | | | |
| Caproic | — | — | 0.5 | 0.5 | — |
| Caprylic | — | — | 6.0 | 4.0 | — |
| Capric | — | — | 5.25 | 3.75 | — |
| Lauric | 1.0 | ' | 44.25 | 47.5 | 0.5 |
| Trideconoic | — | — | — | 0.75 | — |
| Myristic | 0.5 | 0.5 | 19.5 | 18.5 | 1.25/ |
| Palmitic | 16.0 | 24.5 | 10.5 | 8.0 | 44.75 |
| Palmitoleic | 0.25 | 0.5 | 0.25 | — | 0.25 |
| Margaric | 0.25 | 0.25 | — | — | — |
| Stearic | 4.0 | 3.0 | 3.0 | 2.0 | 4.75 |
| Oleic | 14.0 | 18.5 | 8.5 | 13.0 | 37.5 |
| Linoleic | 55.5 | 52.25 | 2.25 | 2.0 | 10.5 |
| Linolenic | 8.5 | 0.5 | — | — | 0.5 |
| Average molecular Wt. | 274.8 | 276.7 | 211.4 | 214.0 | 268.8 |
| Calc IV (Free Acid) | 135.8 | 112.9 | 11.8 | 15.1 | 54.2 |

TABLE III
ANALYSIS OF ACID WATER OBTAINED FROM SAPONIFIED SOAPSTOCKS AFTER ACIDULATION (wt. %)

| | Soybean | Cottonseed | coconut | Palm Kernel | Palm |
| --- | --- | --- | --- | --- | --- |
| Composition: | | | | | |

TABLE III-continued
ANALYSIS OF ACID WATER OBTAINED FROM SAPONIFIED SOAPSTOCKS AFTER ACIDULATION (wt. %)

| | Soybean | Cottonseed | coconut | Palm Kernel | Palm |
|---|---|---|---|---|---|
| Water | 57.11 | 71.78 | 80.62 | 75.59 | 78.80 |
| Organics | 12.66 | 6.19 | 1.81 | 1.56 | 1.56 |
| Inorganics | 30.22 | 22.03 | 17.57 | 22.85 | 19.63 |
| Physical/Chemical Constants: | | | | | |
| Solids | 42.89 | 28.22 | 19.38 | 24.41 | 21.20 |
| TFA | 0.19 | 0.15 | 0.15 | 0.35 | — |
| SO$_4$= | 15.2 | 11.9 | 11.7 | 16.4 | 12.3 |
| PO$_4$= | 4.55 | 1.68 | 0.058 | 0.010 | 0.03 |
| PPm CL | 5.8 | 10.6 | 9.6 | 13.1 | 7.2 |
| Na | — | 4.75 | 39.3 | — | 44.4 |
| Ca | — | 320 | 50 | 40 | — |
| Mn | — | 8.4 | 2.4 | 4.2 | — |
| Mg | — | 2200 | 88 | 22 | — |
| Fe | — | 40 | 47.5 | 170 | — |
| Specific Gravity | 1.22 | 1.23 | 1.12 | 1.18 | 1.15 |

The foregoing tabled results clearly demonstrate the efficiency and economy of the present invention in recovering a 90%-plus free fatty acid product from crude soapstock.

EXAMPLE II

Crude soybean soapstock from an edible oil refinery in the U.S. was processed according to the present invention. Five runs of one gallon each of the soapstock was processed with neutralized acid water from each preceding run used for the next run. This procedure simulates start-up for the present process and permits commercial scale-up to be engineered. Run 5 represents steady-state conditions for continuous operations.

The soapstock analyzed as follows:

TABLE IV
SOAPSTOCK ANALYSIS (wt. %)

| | |
|---|---|
| Total Fatty Acid | 27.1 |
| Water | 61.8 |
| NaOH | 1.6 |

The crude soapstock was combined with 20% (by weight of dry soapstock) of 26° Baume' sodium hydroxide and 10% by weight of neutralized acid water from a subsequent step of the process. Reaction temperature was held at 82°–88° C. for about 2 hours and the product saponified soapstock had a pH of about 10.3 to 10.9 for the five runs.

The saponified soapstock next was acidulated for about two hours with 6% by weight of 66° Baume' sulfuric acid to a pH of 2.5–2.7. The acidulated soapstock then was centrifuged for separation of free fatty acid stream (27.2% by volume), acid water (70.8% by volume), sludge (0.5% by volume), and a minor interfacial layer (2% by volume) of an oil-water-phosphatide emulsion. A portion of acid water was neutralized with NaOH and recycled to the saponification zone for each successive run (the caustic fed to the saponification zone was made by alkalizing this acid water to the proper base strength with the proportion of sodium sulfate salt increasing with each successive run up to a maximum 17.63% under steady-state conditions).

The analysis of the free fatty acid stream, acid water and sludge are given for Run 5 in Tables V, VI, and VII.

TABLE V
FREE FATTY ACID STREAM (wt. %)

| | |
|---|---|
| Free Fatty Acid (as oleic acid) | 91.0 |
| Water | 3.5 |
| Unsaponifiables | 5.14 |

TABLE VI
ACID WATER (wt. %)

| | |
|---|---|
| Water | 71.9 |
| Organics | 10.47 |
| Inorganics (sodium sulfate) | 17.63 |
| (pH of 2.75) | |

TABLE VII
SLUDGE (wt. %)

| | |
|---|---|
| Water | 50.8 |
| Organic | 11.54 |
| Inorganic | 17.66 |

The foregoing clearly show that better than a 90% free fatty acid product can be obtained by the present process. It should be noted that accurate analysis of the soapstock is difficult at best because of the numerous emulsified forms of the components of the soapstock. There also are no industry-accepted standardized testing procedures for analyzing the soapstock. Acceptable testing methods herein generally analyze the soapstock components between about 95 and 105 weight percent. Typically, those components contributing to the under or over value of the soapstock analysis include unsaponifiables, phosphatides, entrained oil, and water. For present purposes, the tabled soapstock analyses provide acceptable information upon which the invention can be based and successfully practiced. More accurate analysis of the soapstock will just improve practice of the invention.

EXAMPLE III

A pilot plant scale operation of the present invention using 200 pounds of soybean soapstock from an edible oil refinery in this country was performed. Analysis of the soapstock appears in Table VIII.

TABLE VIII
SOYBEAN SOAPSTOCK (wt. %)

| | |
|---|---|
| Water | 44.3 |
| Total Fatty Acid | 37.0 |
| Unsaponifiables | 1.3 |
| Neutral Oil | 23.9 |
| (pH of 9.6) | |

In a 40 gallon saponification zone the soapstock was saponified at about 82° C. for about 2 hours with 40 pounds of 26° Be' sodium hydroxide. The zone also was fed with 20 pounds of a make-up 17% sodium sulfate solution (3.4 pounds of anhydrous sodium sulfate and 16.6 pounds of water).

The saponified soapstock then was acidulated for about 2 hours with 66° Be' sulfuric acid to a pH of 1.002 at about 82° C. in a mixing column. The acidulated soapstock then was separated by conventional centrifuging. Analysis of the free fatty acid stream, acid water, and neutralized acid water are set forth in Tables IX, X, and XI.

TABLE IX
*FREE FATTY ACID ANALYSIS (wt. %)

| | |
|---|---|
| Water | 14.8 |
| Total Fatty Acid | 81.4 |
| Free Fatty Acid | 76.8 |

TABLE IX-continued

| *FREE FATTY ACID ANALYSIS (wt. %) | |
|---|---|
| Unsaponifiables | 7.7 |

*The centrifuging separation was not efficiently performed so that the free fatty acid content is lower than normal here.

TABLE X

| ACID WATER ANALYSIS (wt. %) | |
|---|---|
| Water | 68.3 |
| Organic | 9.3 |
| Inorganic | 22.4 |
| (pH of 1.002) | |

TABLE XI

| NEUTRALIZED ACID WATER (wt. %) | |
|---|---|
| Water | 72.9 |
| Organic | 9.73 |
| *Inorganic | 17.37 |
| (pH of 6.305) | |
| TOTAL SOLIDS | 27.1 |
| *Calcium | 0.03 |
| Iron | 0.05 |
| Magnesium | 0.04 |
| Phosphate | 2.3 |

Again, the efficiency of operation of the present invention is shown in this Example. For convenience a make-up salt solution was used rather than a recycle of neutralized acid water, though this does not adversely affect the present process.

Based upon the foregoing Examples and other work on this invention, a commercial scale design of this invention was engineered and is currently being installed in an edible oil refinery in the U.S. which is owned by the assignee of this invention. Various modifications on the process as described in the drawing have been implemented at the refinery. For example, saponification is conducted in three tanks connected in parallel and dual parallel-connected separators also are used. Surge tanks also are provided which accumulate certain flows for leveling out flow rates discharged therefrom. This commercial system is designed to handle about 3,000 to 11,000 pounds per hour of crude soapstock with about 2,400 to 6,000 pounds per hour of a 90%-plus free fatty acid product stream and 6,000 to 9,600 pounds per hour of acid water being withdrawn from the separators. Sodium sulfate water is made by neutralizing the acid water with a recycle flow thereof being fed to a pre-mixing tank with the soapstock fed to the process.

We claim:

1. A process for recovering free fatty acid from aqueous crude soapstock containing saponifiable fatty material comprising a glyceride oil; which comprises:

(a) admitting said soapstock, a first inorganic base, and a recycle of inorganic salt-containing neutralized acid water from a later step of the process into a saponification zone held at a temperature of between about 80° and about 95° C.;

(b) passing the resulting saponified soapstock into an acidulation zone along with inorganic acid and therein springing free fatty acid from said soapstock;

(c) passing the resulting acidulated soapstock into a separation zone and withdrawing therefrom product free fatty acid stream and byproduct acid water;

(d) passing at least a portion of said acid water into a neutralizing zone along with a flow of a second inorganic base sufficient to at least neutralize said acid water with inorganic salt being formed thereby; and (e) recycling at least a portion of said inorganic salt-containing neutralized acid water to said saponification step of the process, the proportion of inorganic base fed to the saponification zone being sufficient to virtually completely saponify said saponifiable fatty material in said soapstock admitted to the process.

2. The process of claim 1 wherein both said first and said second inorganic bases are alkali metal or alkaline earth metal bases.

3. The process of claim 2 wherein both said bases are sodium hydroxide.

4. The process of claim 1 wherein said inorganic acid is a mineral acid.

5. The process of claim 4 wherein said mineral acid is sulfuric acid.

6. The process of claim 1 wherein both said bases are sodium hydroxide, said inorganic acid is sulfuric acid, and said inorganic salt in said recycle is sodium sulfate.

7. The process of claim 1 wherein all said acid water is neutralized in said neutralizing zone and a portion thereof is recycled to said saponification step of the process.

8. The process of claim 1 wherein said crude soapstock is from edible oil refining.

9. The process of claim 1 wherein said saponified fatty material includes phosphatides which are hydrolyzed for recovery of their fatty acid content.

10. The process of claim 1 wherein said inorganic base fed to said saponification zone is about a 25% by weight excess based on the dry weight of said soapstock admitted to said saponification zone, and about 10% by dry weight of said soapstock of said inorganic salt-containing neutralized acid water is recycled to said saponification zone.

* * * * *

UNITED STATES PATENT OFFICE
CERTIFICATE OF CORRECTION

Patent No. 4,118,407          Dated October 3, 1978

Inventor(s) Jerry F.P. Red and Juan B. Ilagan, Jr.

It is certified that error appears in the above-identified patent and that said Letters Patent are hereby corrected as shown below:

Column 1, line 49, after "free" insert -- fatty --.

Column 3, line 45, "there" should read -- these --; line 64, "in" (first occurrence) should read -- is --. Column 6, Table II, the fourth column heading should read -- Palm Kernel --; the fifth column heading should read -- Palm --; third column across from Caprylic should read -- 6.0 --; second column across from Lauric, delete the apostrophe and add a dash; fifth column across from Myristic should read -- 1.25 --. Column 8, Table IX, in the heading after ANALYSIS, "(wt.96)" should read --(wt.%) --. Column 9, Table IX, in the heading after ANALYSIS, "(wt. 96)" should read -- (wt.%) --.

UNITED STATES PATENT OFFICE
CERTIFICATE OF CORRECTION

Patent No. 4,118,407　　　　　　　　　　Dated October 3, 1978

Inventor(s) Jerry F.P. Red and Juan B Ilagan, Jr.

It is certified that error appears in the above-identified patent and that said Letters Patent are hereby corrected as shown below:

Column 9, Table IX, in the heading after ANALYSIS,"( wt. 96)" should read -- (wt.%) --.

Signed and Sealed this

Twenty-sixth Day of December 1978

[SEAL]

Attest:

RUTH C. MASON
Attesting Officer

DONALD W. BANNER
Commissioner of Patents and Trademarks